United States Patent
Ling et al.

(10) Patent No.: US 10,338,386 B2
(45) Date of Patent: Jul. 2, 2019

(54) VEHICLE AND HEAD-UP DISPLAYING SYSTEM AND PROJECTOR THEREFOR

(71) Applicant: BYD COMPANY LIMITED, Shenzhen, Guangdong (CN)

(72) Inventors: Li Ling, Shenzhen (CN); Yifeng Wu, Shenzhen (CN); Ming Li, Shenzhen (CN)

(73) Assignee: BYD COMPANY LIMITED (CN)

( * ) Notice: Subject to any disclaimer, the term of this patent is extended or adjusted under 35 U.S.C. 154(b) by 198 days.

(21) Appl. No.: 15/536,048

(22) PCT Filed: Dec. 25, 2015

(86) PCT No.: PCT/CN2015/099022
§ 371 (c)(1),
(2) Date: Jun. 14, 2017

(87) PCT Pub. No.: WO2016/101920
PCT Pub. Date: Jun. 30, 2016

(65) Prior Publication Data
US 2017/0351093 A1 Dec. 7, 2017

(30) Foreign Application Priority Data

Dec. 25, 2014 (CN) .......................... 2014 1 0820395
Dec. 25, 2014 (CN) ..................... 2014 2 0834490 U (51) Int. Cl.
*G02B 27/01* (2006.01)
*G02B 7/188* (2006.01)
(Continued)

(52) U.S. Cl.
CPC ......... *G02B 27/0149* (2013.01); *G02B 7/185* (2013.01); *G02B 7/188* (2013.01);
(Continued)

(58) Field of Classification Search
CPC ....... G02B 13/0045; G02B 9/62; G02B 1/041
See application file for complete search history.

(56) References Cited

U.S. PATENT DOCUMENTS 6,618,209 B2 * 9/2003 Nishioka .................. G02B 1/06
359/291

FOREIGN PATENT DOCUMENTS

CN 204009230 U 12/2014
CN 204360013 U 5/2015
(Continued)

OTHER PUBLICATIONS

International Search Report and Written Opinion from PCT/CN2015/099022 dated Apr. 1, 2016.

*Primary Examiner* — Joseph P Martinez
(74) *Attorney, Agent, or Firm* — Calfee, Halter & Griswold LLP (57) ABSTRACT

A vehicle, a head-up displaying system and a projector are provided, the projector including a displaying component (1) configured to project an image, and a three-mirror optical device positioned in an optical path of an emergent light of the displaying component (1), configured to reflect the image projected by the displaying component (1) onto a front windshield (5) such that the front windshield (5) reflects the image to eyes of a driver and including: a zoom lens assembly (2) having a zoom lens (21) for zooming in/out the image projected by the displaying component (1), and a first curvature adjusting component configured to adjust a curvature of the zoom lens (21); an image quality compensation lens assembly (3) having an image quality compensation lens (31) configured to compensate for an image quality distortion caused during a change of the curvature of the zoom lens (21), and a second curvature adjusting component configured to adjust a curvature of the image quality compensation lens (31); and a front wind- (Continued)

shield compensation lens assembly (4) configured to compensate for an image distortion caused by the front windshield (5).

13 Claims, 3 Drawing Sheets

(51) Int. Cl.
*G02B 26/08* (2006.01)
*G02B 7/185* (2006.01)

(52) U.S. Cl.
CPC ......... *G02B 26/0825* (2013.01); *G02B 27/01* (2013.01); *G02B 27/0101* (2013.01); *G02B 2027/011* (2013.01); *G02B 2027/0127* (2013.01)

(56) References Cited

FOREIGN PATENT DOCUMENTS

| | | |
|---|---|---|
| CN | 204360014 U | 5/2015 |
| CN | 204360015 U | 5/2015 |
| GB | 201213227 | 9/2012 |

\* cited by examiner

VEHICLE AND HEAD-UP DISPLAYING SYSTEM AND PROJECTOR THEREFOR

CROSS REFERENCE TO RELATED APPLICATION

This application is based on International Application No. PCT/CN2015/099022, filed on Dec. 25, 2015, which claims priority and benefits of Chinese Patent Application No. 201410820395.X, filed with State Intellectual Property Office, P. R. C. on Dec. 25, 2014, and Chinese Patent Application No. 201420834490.0, filed with State Intellectual Property Office, P. R. C. on Dec. 25, 2014, the entire content of which are incorporated herein by reference.

FIELD

Embodiments of the present disclosure generally relate to a vehicle, and more particularly, to a projector, a head-up displaying system and a vehicle.

BACKGROUND

With the improvement of the level of living, there are more requirements for the vehicle. Presently, some vehicles are provided with head-up displaying systems. The head-up displaying system is mounted on a dashboard of a vehicle, projects information onto a front windshield in a form of text and image using the optical reflection principle. And a height of the projection image and eyes of a driver are generally at the same level. The driver may view a virtual image reflected by the front windshield with the projection image projected by the head-up displaying system. In this way, it is easy for the driver to combine a scene outside and the information displayed by the head-up displaying system during driving. The driver may view navigation information, the speed of the vehicle and other information without bowing his/her head, such that the problem of distracting the attention from the road ahead may be avoided, thus improving the driving security.

During a research, researchers found that the driver's eyes are always focused on a certain position, which is usually within 2.5-3 meters distance in the driving process of vehicles, therefore, the existing head-up displaying system generally directly projects the image via a transmission-type displaying screen, and then a virtual image is generated within 2.5-3 meters distance from the driver after being reflected by the front windshield. By this way, the driver can watch the road information ahead, as well as the image projected by the head up displaying system. However, when the vehicle is driving faster, in order to view more road information ahead, the driver may focus on a position farther away than three meters distance, sometimes even up to 6-7 meters distance. However, the position of image projected by the existing head-up displaying system cannot be changed, if the driver wants to get the information from the head-up displaying system, the driver needs to change the sightline between the image and the road information ahead, thus causing the security risks in the driving process.

SUMMARY

The present disclosure provides a vehicle, a head-up displaying system and a projector for a head-up displaying system, so as to solve the problem that it is inconvenient and hard to find an appropriate position at which the image may be viewed by the driver comfortably.

According to embodiments of a first aspect of the present disclosure, there is provided a projector for a head-up displaying system. The projector for a head-up displaying system comprises: a displaying component configured to project an image, and a three-mirror optical device positioned in an optical path of an emergent light of the displaying component, configured to reflect the image projected by the displaying component onto a front windshield such that the front windshield reflects the image to eyes of a driver and comprising: a zoom lens assembly having a zoom lens for zooming in/out the image projected by the displaying component and a first curvature adjusting component configured to adjust a curvature of the zoom lens; an image quality compensation lens assembly having an image quality compensation lens configured to compensate for an image quality distortion caused during a change of the curvature of the zoom lens, and a second curvature adjusting component configured to adjust a curvature of the image quality compensation lens; and a front windshield compensation lens assembly, configured to compensate for an image distortion caused by the front windshield.

With the projector according to the present disclosure, the three-mirror optical device is positioned in the optical path of the emergent light of the displaying component. In the three-mirror optical device, the zoom lens assembly comprises the zoom lens and the first curvature adjusting component, and the image quality compensation lens assembly comprises the image quality compensation lens and the second curvature adjusting component, and thus by adjusting the curvature radiuses of the zoom lens and the image quality compensation lens, the focus of the optical path of the head-up displaying system can be adjusted, and the continuous zoom can be realized. When the vehicle is accelerated and the focus position of the sightline becomes farther, the head-up displaying system can adjust the curvature of the zoom lens in the zoom lens assembly, at the same time the image projected by the head-up displaying system becomes farther, such that the image is coincidence with the focus position of the sightline of the driver, the driver needs not to change the sightline between the image and the road information ahead, the position of the image may be adjusted according to the focus position of the sightline of the driver, thus improving the driving security. At the same time, the zoom lens assembly can further enlarge the image, and thus the driver can get the complex information more clearly. At the same time, the image quality compensation lens assembly may adjust the image quality caused by changing the optical path by the zoom lens, change the curvature of the image quality compensation lens according to rules, compensate for the image quality in the case that the object plane is stationary, and enable to prevent the image quality of image projected by the head-up displaying system from decreasing during the zoom adjustment. Further, by using the front windshield compensation lens assembly, the image distortion caused by the front windshield can be compensated for, thus avoiding the image distortion and improving the image quality.

According to embodiments of a second aspect of the present disclosure, there is provided a head-up displaying system. The head-up displaying system comprises a projector described above.

With the head-up displaying system according to the present disclosure, the three-mirror optical device is positioned in the optical path of the emergent light of the displaying component. In the three-mirror optical device, the zoom lens assembly comprises the zoom lens and the first curvature adjusting component, and the image quality compensation lens assembly comprises the image quality compensation lens and the second curvature adjusting component, and thus by adjusting the curvature radiuses of the zoom lens and the image quality compensation lens, the focus of the optical path of the head-up displaying system can be adjusted, and the continuous zoom can be realized. When the vehicle is accelerated and the focus position of the sightline becomes farther, the head-up displaying system can adjust the curvature of the zoom lens in the zoom lens assembly, at the same time, the image projected by the head-up displaying system becomes farther, such that the image is coincidence with the focus position of the sightline of the driver, the driver needs not to change the sightline between the image and the road information ahead, the position of the image may be adjusted according to the focus position of the sightline of the driver, thus improving the driving security. At the same time, the zoom lens assembly can further enlarge the image, and thus the driver can get the complex information more clearly. At the same time, the image quality compensation lens assembly may adjust the image quality caused by changing the optical path by the zoom lens, change the curvature of the image quality compensation lens according to rules, compensate for the image quality in the case that the object plane is stationary, and enable to prevent the image quality of image projected by the head-up displaying system from decreasing during the zoom adjustment. Further, by using the front windshield compensation lens assembly, the image distortion caused by the front windshield can be compensated for, thus avoiding the image distortion and improving the image quality.

According to embodiments of a third aspect of the present disclosure, there is provided a vehicle. The vehicle comprises a head-up displaying system described above.

With the vehicle according to the present disclosure, the three-mirror optical device is positioned in the optical path of the emergent light of the displaying component. In the three-mirror optical device, the zoom lens assembly comprises the zoom lens and the first curvature adjusting component, and the image quality compensation lens assembly comprises the image quality compensation lens and the second curvature adjusting component, and thus by adjusting the curvature radiuses of the zoom lens and the image quality compensation lens, the focus of the optical path of the head-up displaying system can be adjusted, and the continuous zoom can be realized. When the vehicle is accelerated and the focus position of the sightline becomes farther, the head-up displaying system can adjust the curvature of the zoom lens in the zoom lens assembly, at the same time, the image projected by the head-up displaying system becomes farther, such that the image is coincidence with the focus position of the sightline of the driver, the driver needs not to change the sightline between the image and the road information ahead, the position of image may be adjusted according to the focus position of the sightline of the driver, thus improving the driving security. At the same time, the zoom lens assembly can further enlarge the image, and thus the driver can get the complex information more clearly. At the same time, the image quality compensation lens assembly may adjust the image quality caused by changing the optical path by the zoom lens, change the curvature of the image quality compensation lens according to rules, compensate for the image quality in the case that the object plane is stationary, and enable to prevent the image quality of image projected by the head-up displaying system from decreasing during the zoom adjustment. Further, by using the front windshield compensation lens assembly, the image distortion caused by the front windshield can be compensated for, thus avoiding the image distortion and improving the image quality.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the following, an projector for a head-up displaying system, a head-up displaying system, and a vehicle are described in detail with reference to drawings.

Figure 1:
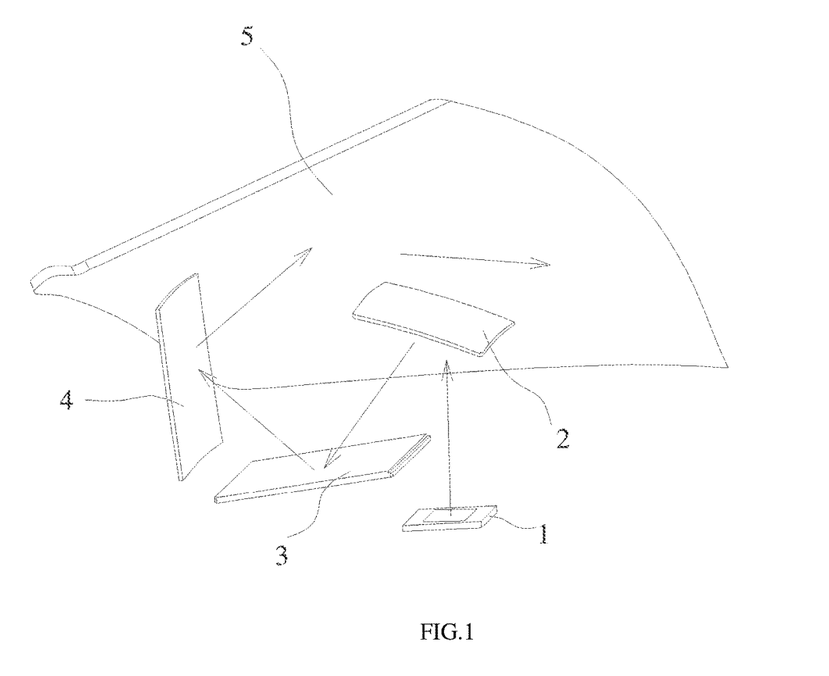
FIG. 1 is a schematic diagram illustrating an optical path in a head-up displaying system according to an embodiment of the present disclosure.

FIG. 1 is a schematic diagram illustrating an optical path in a head-up displaying system according to an embodiment of the present disclosure. A projector for a head-up displaying system comprises a displaying component 1 configured to project an image, and a three-mirror optical device positioned in an optical path of an emergent light of the displaying component 1, configured to reflect the image projected by the displaying component 1 onto a front windshield 5 such that the front windshield 5 reflects the image to eyes of a driver; and the three-mirror optical device comprises: a zoom lens assembly 2, an image quality compensation lens assembly 3 and the front windshield compensation lens assembly 4.

In an embodiment, the zoom lens assembly 2, the image quality compensation lens assembly 3 and the front windshield compensation lens assembly 4 are sequentially disposed in the optical path of the emergent light.

The zoom lens assembly 2 has a zoom lens 21 for zooming in/out the image projected by the displaying component 1, and a first curvature adjusting component for adjusting a curvature of the zoom lens;

The image quality compensation lens assembly 3 has an image quality compensation lens 31 for compensating for an image quality distortion caused during a change of the curvature of the zoom lens 21, and a second curvature adjusting component for adjusting a curvature of the image quality compensation lens 31.

The front windshield compensation lens assembly 4 is configured to compensate for an image distortion caused by the front windshield 5. At the same time, the front windshield compensation lens assembly 4 is configured to reflect the light from the image quality compensation lens assembly 3 onto the front windshield 5. Furthermore, by adding an angle adjusting mechanism in the front windshield compensation lens assembly 4, the angle of reflection can be adjusted, thus adjusting a height of the image projected by the projector. After being reflected by the zoom lens assembly 2, the image quality compensation lens assembly 3, the front windshield compensation lens assembly 4 and the front windshield 5, the light sent from the displaying component 1 is reflected to the eyes of the driver. The surface curvatures of the zoom lens 21 and the image quality compensation lens 31 may be changed, and adjusted via the first curvature adjusting component and the second curvature adjusting component respectively.

In an embodiment, the zoom lens component 2 can be used to reflect the optical path, and configured to zoom in/out the image projected by the displaying component 1, and the focus of the zoom lens may be adjusted by the first curvature adjusting component, such that the magnification times of the image may be adjusted. The image may be distorted and the image quality may be lessened after zooming in/out the image by the zoom lens assembly 2. Thus, the image quality compensation lens assembly 3 is disposed behind the zoom lens assembly 2 in the optical path of the emergent light. The image quality compensation lens assembly 3 may adjust the image quality caused by changing the optical path by the zoom lens assembly 2, change the curvature of the image quality compensation lens 3 regularly, and compensate for the image quality in the case that the object plane is stationary, such that the image quality of the image projected by the head-up displaying system does not reduce greatly during the change of the curvature. Since the front windshield 5 of the vehicle is arc glass, a pincushion distortion or barrel distortion may occur on the projection image projected onto the front windshield 5. For eliminating the distortion, the front windshield compensation lens assembly 4 is disposed in the optical path.

Each of the above-mentioned zoom lens and the image quality compensation lens is a concave mirror. And the front windshield compensation lens assembly 4 is a saddle mirror (named as Biconic, the surface type means that aspheric coefficients can be added in a horizontal direction and a vertical direction).

The displaying component 1 may be any known structure. The displaying component 1 comprises a transmission-type displaying screen and an optical source component beneath the transmission-type displaying screen. The optical source generated by the optical source component irradiates the transmission-type displaying screen to project the image displayed on the transmission-type displaying screen. In this embodiment, the optical source component comprises a backlight plate, and backlights distributed on the backlight plate in an array mode. As a preferred implementation, the optical source component may also be provided with condensing lenses which are corresponding respectively to the backlights and distributed in the array mode. The condensing lenses may be disposed on the backlight plate directly, or the condensing lenses may cover the backlights. The condensing lenses may also be stuck on a condensing substrate, or integrated with the condensing substrate. The condensing lenses may condense light, improve the utilization of the light, enable the emergent light to be even, and achieve a better irradiation effect.

In an embodiment, the curvature is a rotation rate of tangent angle with respect to a point on a curve relative to the arc, defined by the differential, and indicating the degree that the curve deviates from a straight line. A reciprocal of the curvature is the curvature radius. The smaller the curvature, the greater the curvature radius, the flatter the mirror surface, and the greater the focal distance.

"a zoom lens assembly 2, an image quality compensation lens assembly 3, and a front windshield compensation lens assembly 4 sequentially disposed in the optical path of the emergent light" means that, the zoom lens assembly 2 is disposed in the optical path of the emergent light of the displaying component 1, the image quality compensation lens assembly 3 is disposed in the optical path of the emergent light of the zoom lens assembly 2, the front windshield compensation lens assembly 4 is disposed in the optical path of the emergent light of the image quality compensation lens assembly 3, and the emergent light of the front windshield compensation lens assembly 4 is projected onto the front windshield 5.

Figure 2:
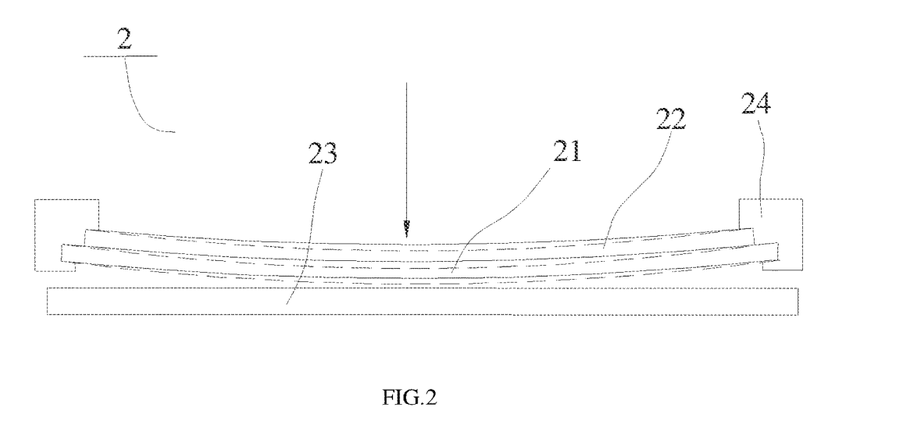
FIG. 2 is a schematic diagram of a first curvature adjusting component according to an embodiment of the present disclosure.
Figure 3:
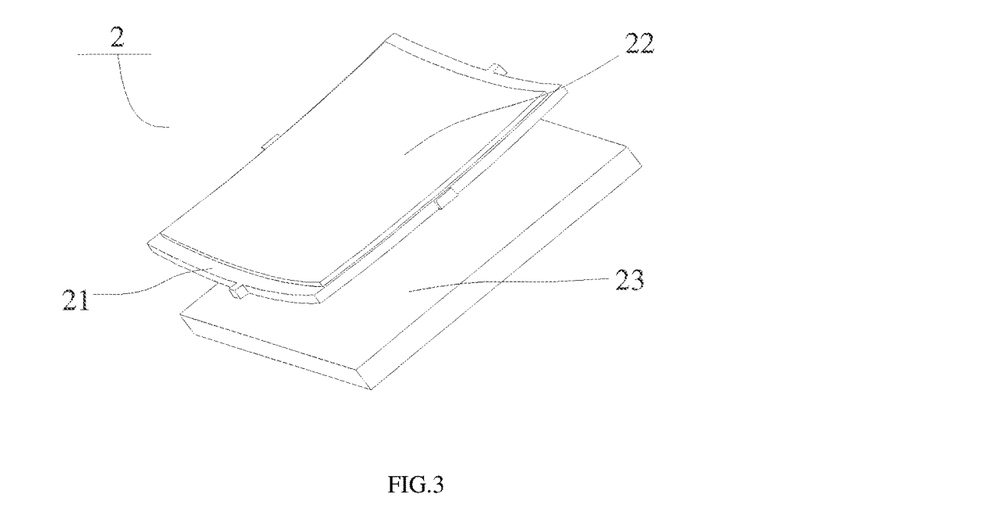
FIG. 3 is a schematic diagram of a first curvature adjusting component according to another embodiment of the present disclosure.

The first curvature adjusting component of the zoom lens 21 is not limited to a specific form. As long as the first curvature adjusting component is controllable and can change the curvature, the first curvature adjusting component may be controlled electrically or mechanically. FIG. 2 is a schematic diagram of a first curvature adjusting component according to an embodiment of the present disclosure. FIG. 3 is a schematic diagram of a first curvature adjusting component according to another embodiment of the present disclosure. As shown in FIG. 2 and FIG. 3, the first curvature adjusting component of the zoom lens 21 comprises a zoom conducting substrate 23 and a zoom conducting film 22 affixed on the zoom lens 21. A first electric field is generated between the zoom conducting film 22 and the zoom conducting substrate 23, a first electrostatic driving force upward or downward is produced in the first electric field and is applied to the zoom lens 21, such that the zoom lens 21 is deformed upward or downward (as shown in FIG. 2, under the electrostatic driving force indicated by the arrow, the zoom lens 21 is deformed to the position shown by the broken line), so as to adjust the curvature of the zoom lens 21

In an embodiment, as shown in FIG. 2 and FIG. 3, the zoom lens 21 is disposed between the zoom conducting film 22 and the zoom conducting substrate 23. The zoom lens 21 is disposed in a zoom lens frame 24.

Figure 4:
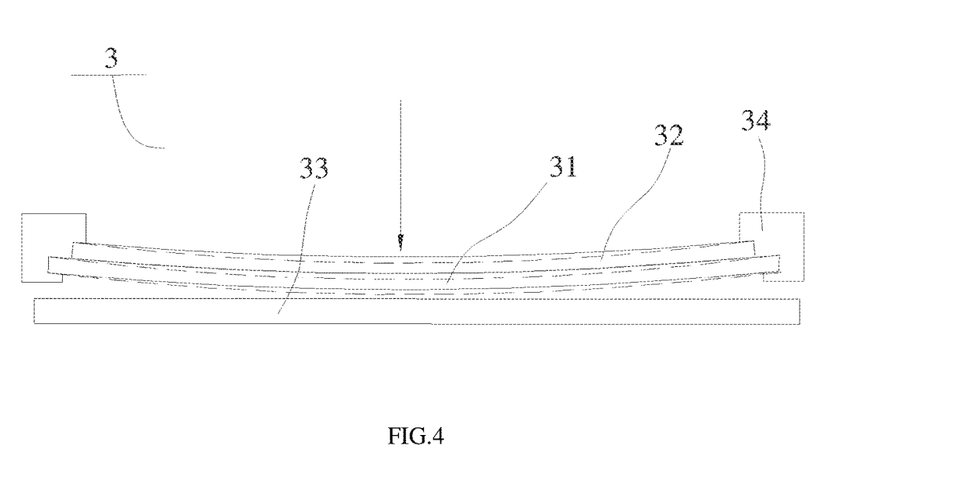
FIG. 4 is a schematic diagram of a second curvature adjusting component according to an embodiment of the present disclosure.
Figure 5:
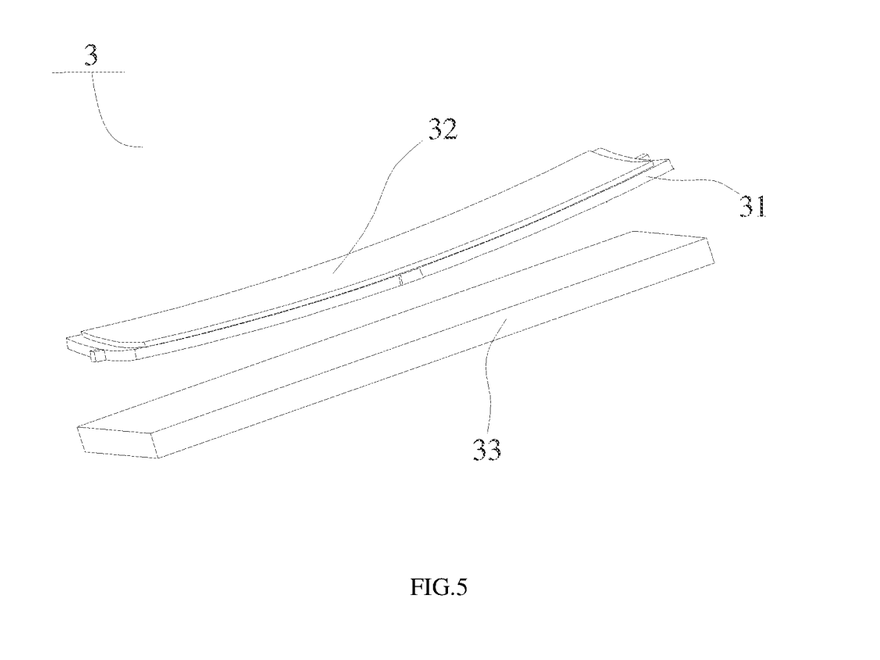
FIG. 5 is a schematic diagram of a second curvature adjusting component according to another embodiment of the present disclosure.

The second curvature adjusting component is not limited to a specific form. As long as the second curvature adjusting component is controllable and can change the curvature, the second curvature adjusting component may be controlled electrically or mechanically. FIG. 4 is a schematic diagram of a second curvature adjusting component according to an embodiment of the present disclosure. FIG. 5 is a schematic diagram of a second curvature adjusting component according to another embodiment of the present disclosure. As shown in FIG. 4 and FIG. 5, the second curvature adjusting component comprises a compensation conducting substrate 33 and a compensation conducting film 32 affixed on the image quality compensation lens 31. A second electric field is generated between the compensation conducting film 32 and the compensation conducting substrate 33, a second electrostatic driving force upward or downward is produced in the second electric field and is applied to the image quality compensation lens 31 such that the image quality compensation lens 31 is deformed upward or downward (as shown in FIG. 4, under the electrostatic driving force indicated by the arrow, the image quality compensation lens 31 is deformed to the position shown by the broken line), so as to adjust the curvature of the image quality compensation lens 31.

In an embodiment, as shown in FIG. 4 and FIG. 5, the image quality compensation lens 31 is disposed between the compensation conducting film 32 and the compensation conducting substrate 33. The image quality compensation lens 31 is disposed in an image quality compensation lens frame 34.

The adjusting curvature principles of the first curvature adjusting component and the second curvature adjusting component may be simply described as follows. The zoom conducting substrate 23 and the compensation conducting substrate 33 may be collectively called the conducting substrate, the zoom conducting film 22 and the compensation conducting film 32 may be collectively called the conducting film, the image quality compensation lens 31 and the zoom lens 21 may be collectively called the lens, and the zoom lens frame 24 and the image quality compensation lens frame 34 may be collectively called the lens frame. The curvature of the first curvature adjusting component and the curvature of the second curvature adjusting component may be adjusted by means of electric control mode. An electric field is generated between the conducting film and the conducting substrate and an electrostatic driving force upward or downward is produced. The electrostatic driving force is applied to the lens, such that the lens is deformed upward or downward slightly to change the curvature of the lens. By changing the value and direction of the voltage of the electric filed, the size and the direction of the electrostatic driving force may be controlled. Therefore, the curvature of the head-up displaying system may be changed by changing the voltage applied between the conducting film and the conducting substrate.

In an embodiment, according to the Gauss optics theory, a deformation value $\alpha_1$ of the zoom lens 21 (the deformation value is the difference between the curvature radius before the deformation and the curvature radius after the deformation) can be calculated according to the following formula.

$$\alpha_1 = \frac{1}{16f}\left(D + W\frac{s}{q}\right)^2 \frac{q}{s} \frac{\tau-1}{\tau} \quad (1)$$

Where, a deformation value $\alpha_2$ of the image quality compensation lens 31 can be calculated according to the following formula.

$$\alpha_2 = -\frac{1}{16} \frac{D_2^2}{f} \frac{\tau-1}{qs} \quad (2)$$

Where, f is a total focus of the head-up displaying system, D is an entrance pupil diameter, $\tau$ is a zoom ratio, s is a ratio of a distance between the zoom lens 21 and the image quality compensation lens 31 to the total focus f of the head-up displaying system, q is a ratio of a clear aperture of the zoom lens 21 to that of the image quality compensation lens 31, and W is twice of the height of image plane.

Where, the relationship between the lens radius and the electrostatic driving force F generated by applying the voltage between the conducting film and the conducting substrate is expressed by the follow formula.

$$\alpha(r) = \frac{F}{4T_0}\left[r^2 - r_1^2 + 2r_1^2 \ln\left(\frac{r_1}{r_0}\right)\right] \quad r < r_1$$

$$\alpha(r) = \frac{F}{4T_0}\left[2r_1^2 \ln\left(\frac{r_1}{r_0}\right)\right] \quad r_1 < r < r_0$$

Where, $T_0$ is a film surface tension, $r_0$ is an initial radius of the lens, and $r_1$ is a maximum deformation radius.

According to the Gauss optics theory, if the medium in an object space is the same as that in an image space, a spherical mirror satisfies the following formula:

$$\frac{1}{l'} + \frac{1}{l} = \frac{1}{f'}$$

Where l' is an image distance, l is an object distance, and f' is a total focus of the head-up displaying system.

In an embodiment, the magnification ratio of the head-up displaying system is:

$$\beta = -\frac{l'}{l}.$$

In an embodiment, the object distance of the head-up displaying system is constant, when the focus becomes larger, the image distance becomes larger, the magnification ratio becomes larger, that is, the distance of the image that the driver may see becomes farther and the image becomes bigger; when the focus becomes smaller, the image distance becomes smaller, the magnification ratio becomes smaller, that is, the distance of the image that the driver may see becomes nearer.

With the first curvature adjusting component and the second curvature adjusting component, the curvature can be adjusted, and by applying the voltage between the conducting film and the conducting substrate, the curvature or the curvature radius can be calculated to obtain the deformation value of the lens, thus obtaining the variation of the focus of the head-up displaying system. And then, the focus of the head-up displaying system after adjusting head-up displaying the system may be obtained as needed, and the change of voltage required for adjusting the curvature of the zoom lens 21 and the curvature of the image quality compensation lens 31 can be obtained.

With the projector according to the present disclosure, the three-mirror optical device is positioned in the optical path of the emergent light of the displaying component. In the three-mirror optical device, the zoom lens assembly comprises the zoom lens and the first curvature adjusting component, and the image quality compensation lens assembly comprises the image quality compensation lens and the second curvature adjusting component, and thus by adjusting the curvature radius of the zoom lens and the curvature radius of the image quality compensation lens, the focus of the optical path of the head-up displaying system can be adjusted, and the continuous zoom can be realized. When the vehicle is accelerated and the focus position of the sightline becomes farther, the head-up displaying system can adjust the curvature of the zoom lens in the zoom lens assembly, at the same time, the image projected by the head-up displaying system becomes farther, such that the image is coincidence with the focus position of the sightline of the driver, the driver needs not to change the sightline between the image and the road information ahead, the position of the image may be adjusted according to the focus position of the sightline of the driver, thus improving the driving security. At the same time, the zoom lens assembly can further enlarge the image, and thus the driver can get the complex information more clearly. At the same time, the image quality compensation lens assembly may adjust the image quality caused by changing the optical path by the zoom lens, change the curvature of the image quality compensation lens according to rules, compensate for the image quality in the case that the object plane is stationary, and enable to prevent the image quality of image projected by the head-up displaying system from decreasing during the zoom adjustment. Further, by using the front windshield compensation lens component, the image distortion caused by the front windshield can be compensated for, thus avoiding the image distortion and improving the image quality.

In an embodiment, a working process of the head-up displaying system can be described as follow.

When the vehicle detects the vehicle speed is changed and determines that the focus position of the sightline of the driver is changed, the zoom lens assembly 2 can adjust the curvature of the zoom lens 21 automatically, and then the total focus of the head-up displaying system varies, the position of image projected by the head-up displaying system varies, and thus the position of image is coincidence with the focus position of the sightline of the driver. At the same time, as the zoom lens component 2 adjusts of the curvature of the zoom lens, the image quality compensation lens can adjust the image quality automatically for providing the high quality image to the driver. Further, by using the front windshield compensation lens assembly 4, an image distortion caused by the front windshield 5 can be compensated for, thus avoiding the image distortion.

In an embodiment, the head-up displaying system comprises the above projector.

With the head-up displaying system according to the present disclosure, the three-mirror optical device is positioned in the optical path of the emergent light of the displaying component 1. In the three-mirror optical device, the zoom lens assembly 2 comprises the zoom lens 21 and the first curvature adjusting component, and the image quality compensation lens assembly comprises the image quality compensation lens and the second curvature adjusting component, and thus by adjusting the curvature radius of the zoom lens and the curvature radius of the image quality compensation lens 31, the focus of the optical path of the head-up displaying system can be adjusted, and the continuous zoom can be realized. When the vehicle is accelerated and the focus position of the sightline becomes farther, the head-up displaying system can adjust the curvature of the zoom lens 21 in the zoom lens assembly 2, at the same time, the image projected by the head-up displaying system becomes farther, such that the image is coincidence with the focus position of the sightline of the driver, the driver needs not to change the sightline between the image and the road information ahead, the position of the image may be adjusted according to the focus position of the sightline of the driver, thus improving the driving security. At the same time, the zoom lens assembly can further enlarge the image, and thus the driver can get the complex information more clearly (For example, due to the problem that the sightline is obstructed, the size of the displayed image is limited, which is generally no more than 13 inches, and thus the detail in the complex image such as maps is hard to see. However, magnification ratio of the image may be increased by the zoom adjustment, such that the original information may become clear, but not all the information may be displayed on the LCD due to the limitation of the image size. The essence is that, the entire image is enlarged, and only part of the enlarged image is displayed. Therefore, the image is enlarged to make the detailed information in the image easy to be identified). At the same time, the image quality compensation lens assembly 3 may adjust the image quality caused by changing the optical path by the zoom lens 21, change the curvature of the image quality compensation lens 31 according to rules, compensate for the image quality in the case that the object plane is stationary, and enable to prevent the image quality of image projected by the head-up displaying system from decreasing during the zoom adjustment. Further, by using the front windshield compensation lens assembly 4, the image distortion caused by the front windshield 5 can be compensated for, thus avoiding the image distortion.

In an embodiment, the vehicle comprises the above head-up displaying system.

With the vehicle according to the present disclosure, the three-mirror optical device is positioned in the optical path of the emergent light of the displaying component. In the three-mirror optical device, the zoom lens assembly comprises the zoom lens and the first curvature adjusting component, and the image quality compensation lens assembly comprises the image quality compensation lens and the second curvature adjusting component, and thus by adjusting the curvature radius of the zoom lens and the curvature radius of the image quality compensation lens, the focus of the optical path of the head-up displaying system can be adjusted, and the continuous zoom can be realized. When the vehicle is accelerated and the focus position of the sightline becomes farther, the head-up displaying system can adjust the curvature of the zoom lens in the zoom lens assembly, at the same time, the image projected by the head-up displaying system becomes farther, such that the image is coincidence with the focus position of the sightline of the driver, the driver needs not to change the sightline between the image and the road information ahead, the position of image may be adjusted according to the focus position of the sightline of the driver, thus improving the driving security. At the same time, the zoom lens assembly can further enlarge the image, and thus the driver can get the complex information more clearly. At the same time, the image quality compensation lens assembly may adjust the image quality caused by changing the optical path by the zoom lens, change the curvature of the image quality compensation lens according to rules, compensate for the image quality in the case that the object plane is stationary, and enable to prevent the image quality of image projected by the head-up displaying system from decreasing during the zoom adjustment. Further, by using the front windshield compensation lens assembly, the image distortion caused by the front windshield can be compensated for, thus avoiding the image distortion.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A projector for a head-up displaying system, comprising:

a displaying component configured to project an image, and a three-mirror optical device positioned in an optical path of an emergent light of the displaying component, configured to reflect the image projected by the displaying component onto a front windshield such that the front windshield reflects the image to eyes of a driver, and comprising:

a zoom lens assembly, comprising a zoom lens for zooming in/out the image projected by the displaying component, and a first curvature adjusting component configured to adjust a curvature of the zoom lens;

an image quality compensation lens assembly, comprising an image quality compensation lens configured to compensate for an image quality distortion caused during a change of the curvature of the zoom lens, and a second curvature adjusting component configured to adjust a curvature of the image quality compensation lens; and a front windshield compensation lens assembly, configured to compensate for an image distortion caused by the front windshield.

2. The projector according to claim 1, wherein the zoom lens assembly, the image quality compensation lens assembly and the front windshield compensation lens assembly are sequentially disposed in the optical path of the emergent light of the displaying component.

3. The projector according to claim 2, wherein the zoom lens assembly is disposed in the optical path of the emergent light of the displaying component, the image quality compensation lens assembly is disposed in an optical path of an emergent light of the zoom lens assembly;

the front windshield compensation lens assembly is disposed in an optical path of an emergent light of the image quality compensation lens assembly, and an emergent light of the front windshield compensation lens assembly is projected onto the front windshield.

4. The projector according to claim 1, wherein the first curvature adjusting component comprises a zoom conducting substrate and a zoom conducting film affixed on the zoom lens;

wherein a first electric field is generated between the zoom conducting film and the zoom conducting substrate, a first electrostatic driving force upward or downward in the first electric field is applied to the zoom lens such that the zoom lens is deformed upward or downward to adjust the curvature of the zoom lens.

5. The projector according to claim 4, wherein the zoom lens is disposed between the zoom conducting film and the zoom conducting substrate.

6. The projector according to claim 1, wherein the zoom lens is disposed in a zoom lens frame.

7. The projector according to claim 1, wherein the second curvature adjusting component comprises a compensation conducting substrate and a compensation conducting film affixed on the image quality compensation lens;

wherein a second electric field is generated between the compensation conducting film and the compensation conducting substrate, a second electrostatic driving force upward or downward in the second electric field is applied to the image quality compensation lens such that the image quality compensation lens is deformed upward or downward to adjust the curvature of the image quality compensation lens.

8. The projector according to claim 7, wherein the image quality compensation lens is disposed between the compensation conducting film and the compensation conducting substrate.

9. The projector according to claim 1, wherein the image quality compensation lens is disposed in an image quality compensation lens frame.

10. The projector according to claim 1, wherein the displaying component comprises: a transmission-type displaying screen and an optical source component beneath the transmission-type displaying screen.

11. The projector according to claim 10, wherein the optical source component comprises a backlight plate, backlights distributed on the backlight plate in an array mode, and condensing lenses corresponding respectively to the backlights and distributed in the array mode.

12. A head-up displaying system, comprising a projector for a head-up displaying system, comprising:

a displaying component configured to project an image, and a three-mirror optical device positioned in an optical path of an emergent light of the displaying component, configured to reflect the image projected by the displaying component onto a front windshield such that the front windshield reflects the image to eyes of a driver, and comprising:

a zoom lens assembly, comprising a zoom lens for zooming in/out the image projected by the displaying component, and a first curvature adjusting component configured to adjust a curvature of the zoom lens;

an image quality compensation lens assembly, comprising an image quality compensation lens configured to compensate for an image quality distortion caused during a change of the curvature of the zoom lens, and a second curvature adjusting component configured to adjust a curvature of the image quality compensation lens; and a front windshield compensation lens assembly, configured to compensate for an image distortion caused by the front windshield.

13. A vehicle, comprising a head-up displaying system, comprising a projector for a head-up displaying system, comprising:

a displaying component configured to project an image, and a three-mirror optical device positioned in an optical path of an emergent light of the displaying component, configured to reflect the image projected by the displaying component onto a front windshield such that the front windshield reflects the image to eyes of a driver, and comprising:

a zoom lens assembly, comprising a zoom lens for zooming in/out the image projected by the displaying component, and a first curvature adjusting component configured to adjust a curvature of the zoom lens;

an image quality compensation lens assembly, comprising an image quality compensation lens configured to compensate for an image quality distortion caused during a change of the curvature of the zoom lens, and a second curvature adjusting component configured to adjust a curvature of the image quality compensation lens; and a front windshield compensation lens assembly, configured to compensate for an image distortion caused by the front windshield.

* * * * *